Oct. 20, 1959  W. OSENBERG  2,909,417
MANUFACTURE OF SINGLE OR MULTI-STAGE GRINDING RINGS OR THE LIKE
Filed Dec. 12, 1955
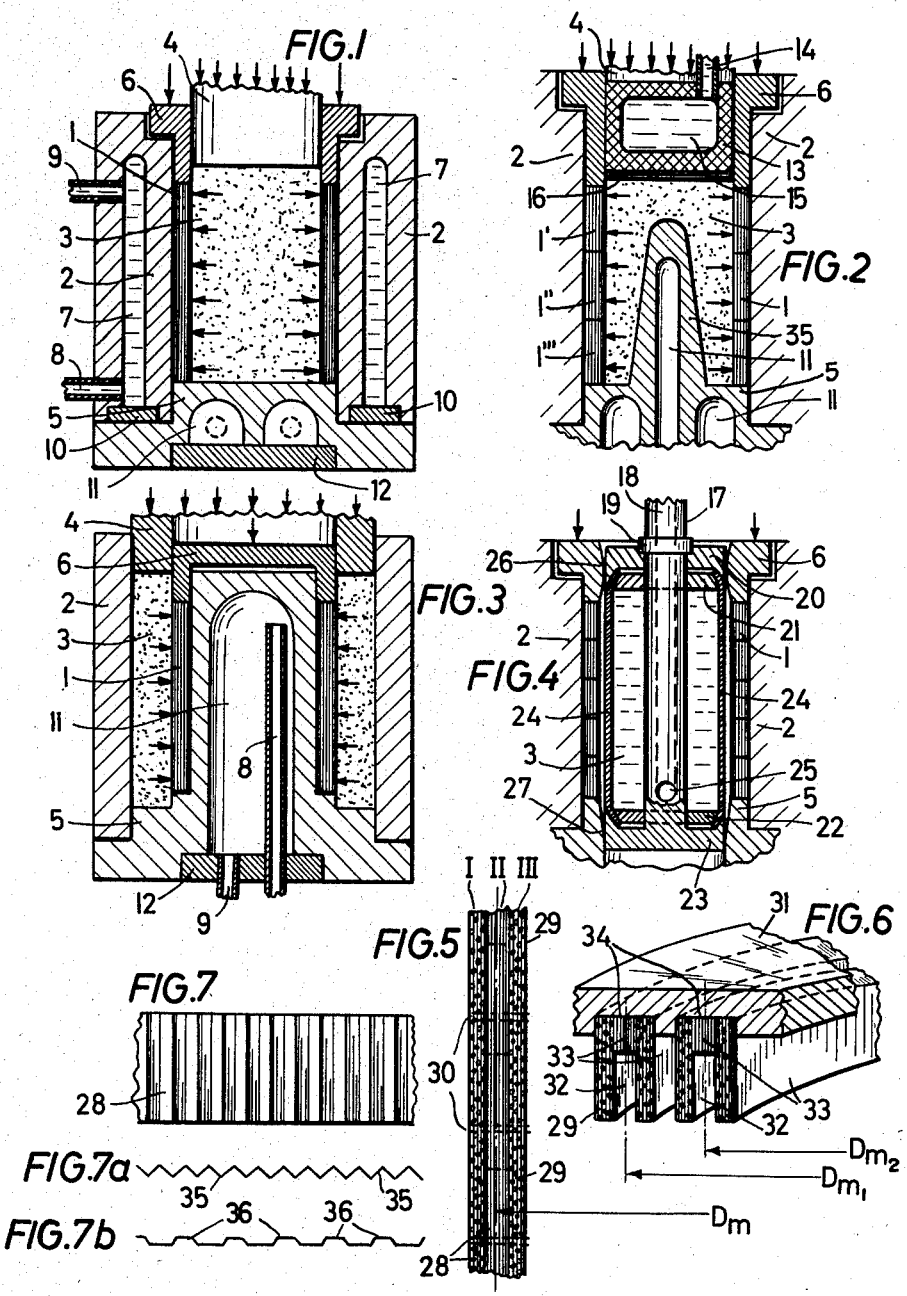
INVENTOR.
WERNER OSENBERG
BY
Wenderoth, Lind & Ponack
Attys.

United States Patent Office 2,909,417
Patented Oct. 20, 1959

2,909,417

MANUFACTURE OF SINGLE OR MULTI-STAGE GRINDING RINGS OR THE LIKE

Werner Osenberg, Gehrden, Germany, assignor to Bisterfeld & Stolting, Radevormwald (Rhineland), Germany, a firm Application December 12, 1955, Serial No. 552,590

Claims priority, application Germany December 31, 1954

10 Claims. (Cl. 51—298)

The present invention concerns a method of manufacturing compounded pressed parts, of hollow cylindrical form, such as grinding rings permeated with hard granular non-metallic or metallic particles, brake linings having wear-resisting insertions and the like.

An object of the present invention is to increase the frictional value of the compounded pressed part, which is a tube or a plurality of tubular sections, by pressure, exerted radially on the walls thereof, with the simultaneous conduction of heat; tube or tubular sections are pre-set, if necessary, and pre-formed from heat-setting synthetic resins (duro-plasts) or wound from impregnated layers, a compacting being obtained which removes any internal cavities in the compounded pressed part and firmly embeds granular particles therein, thereby increasing the strength and the modulus of elasticity of the entire pressed part. With a resin content of more than 28%, the resin melts to form a coherent bonding. In pressed materials consisting of widths of fabric, the capillary forces assist and deeper penetration of the resin into the yarns is achieved.

With known tube-winding machines, which operate with a rotating steel mandrel as well as heat and pressure rollers, it is not possible to obtain a compacting of tubes which ensures that the granular particles are firmly embedded therein; it is impossible to obtain a uniform compacting of the tube even with radially operating press rams.

According to the present invention, the tube or tubular section is inserted into a moulding tool, compacting being effected with simultaneous conduction of heat, by pressure exerted radially on the walls of the tubes or tubular sections by gaseous, liquid or plastic hydraulic means. The pressures in the moulding medium itself may be produced by oil pressure or with a mechanically controlled ram.

The surface of the moulding tool or the core thereof should preferably be constructed with a plurality of parts for the easy removal of the compacted and set pressed part. The gaseous, fluid or plastic moulding means may act directly on the wall of the part inserted into the tool, or with the interposition of an elastic, metallic or non-metallic intermediate member (diaphragm, tube, bag or the like). The non-metallic intermediate member, which may for example consist of silicone rubber, must remain stable at the setting temperature of the heat-setting synthetic resins and retain its elastic properties. Silicone rubber may also be used as a plastic moulding medium, acting directly without an intermeditae member. Owing to its consistency, hydroplastic composition makes it possible to use rough fittings for the manufacture of the moulding tool, as no account has to be taken of leakage losses.

The moulding tool, which is heatable in known manner, is closed, after the insertion of the tubes or tubular sections, so that it is not possible for the part to be compacted to expand in a longitudinal direction after which the gaseous, fluid or plastic moulding media operate, with the simultaneous application of heat, to produce setting. If the tubes or tubular sections are to lose their deformable properties after compacting, setting and cooling of the mould are effected under pressure. The most economic method of heating the moulding tool is by using hot water, steam or oil heating, it being possible to conduct a cooling fluid through the mould after cutting off the supply of heating media.

The moulding tool and its press ram may be locked, after the necessary temperature for complete setting and optimum compression of the parts to be compacted has been reached, so that these parts can be removed from the table of the working machine, whereby the operative conditions, such as the pressure remains constant for a given period of time.

The hollow cylindrical tubes or tubular sections to be compacted, pre-formed or wound, may be constructed in several layers, with a plurality of zones. Two zones may have embedded therein, hard granular particles and an intermediate zone may be without hard particles. This permits the obtaining of a grinding ring having two or more grinding paths by chipping out a part of the zone free of hard particles.

The layers coated with a heat-setting synthetic resin, such as a solution of phenol-formaldehyde resin in spirit, and which are used for the manufacture of wound tubes or tubular sections, may be of a metallic or non-metallic material. From the point of view of good impregnation, firm embedding of the granular hard particles and obtaining a coherent, well blended bond, the layers should be built-up as a fabric. Since the individual layers must be provided with the possibility of extension, during the compacting of the wound tubes or tubular sections, ribbings, impressions and the like are pressed or milled into the saturated width of fabric before the winding, said ribbings and the like preventing the tearing of the layers.

The building-up of grinding rings by winding layers impregnated with a heat-setting synthetic resin ensures, a uniform distribution of the hard granular metallic or non-metallic particles in the desired concentration between the layers and the reliable embedding of the hard particles until they are completely worn away; it also permits the building-up in layers of a grinding ring having a plurality of zones separated from each other with or without embedded abrasive.

The method of manufacturing synthetically bound abrasive cylinders, consisted hitherto in pressing and hardening a mixture of homogenised abrasive particles and synthetic resin in a pressure mould with the use of a ram of circular cross-section moving in the direction of the central axis of the mixture; the pressures are not distributed uniformly over the entire depth of the cylinder, owing to the coefficient of friction existing between the mixture and the walls of the mould. In contrast to the above method based on the concept of the present invention offers the advantage of a uniform non-porous compacting and uniform distribution and concentration of the granular hard material by the exerting of radial pressures distributed uniformly over the entire surface of the tubes or tubular sections.

The invention will be described further, by way of example, with reference to the accompanying drawings in which:

Fig. 1 is a cross-section through a heatable moulding tool in which outwardly directed radial pressures are exerted on a tube to be treated;

Fig. 2 is a cross-section through a modified form of heatable moulding tool in which outwardly directed radial pressures are exerted on a plurality of tubular sections to be treated;

Fig. 3 is a cross-section through another form of heatable moulding tool in which inwardly directed radial pressures are exerted on a tube to be treated;

Fig. 4 is a cross-section through a further modification of a heatable moulding tool in which outwardly directed radial pressures are exerted on a plurality of tubular sections to be treated;

Fig. 5 is a partial cross-section through the wall of a tubular section wound from impregnated layers and having three zones, the outer two zones, embedded with abrasive particles, enclosing a central zone having no abrasive particles;

Fig. 6 is a fragmentary cross-section through two coaxial grinding rings mounted on a carrier disc, each ring having two grinding paths, the outer zones of which are permeated with abrasive particles;

Fig. 7 is a fragmentary plan of an impregnated layer which is transversely ribbed by stamping or milling;

Fig. 7a is a fragmentary side elevation of an impregnated layer which is transversely ribbed by stamping or milling; and Fig. 7b is a fragmentary side elevation of a layer having bowl-shaped impressions.

In the figures like parts are indicated by like reference numerals.

A tube or plurality of tubular sections 1 having embedded therein hard granular particles, either pre-formed of heat setting synthetic resin (duro-plast) or wound from impregnated layers, initially compacted, and pre-hardened if necessary, is arranged in a heatable moulding tool 2 (Fig. 1) a hydro-plastic composition 3, which must remain stable at the setting temperature of the synthetic resin binding, is disposed inside the tube 1 and a hydraulically or mechanically controlled ram 4 is provided thereabove. The lower part of the moulding tool 2, comprises a heatable base plate 5. A collar 6 prevents longitudinal expansion of the tube 1 when the radial forces act in the direction indicated by the arrows. Heating passages 7 and 11, closed by covers 10 and 12 respectively, are for the uniform heating and, when required, for cooling the moulding tool. Heating or cooling media is conveyed to the tool through conduits 8 and 9.

After positioning the tube 1 in the moulding tool 2, the hydro-plastic composition 3 is inserted. Upon a downward movement of the ram 4, radial pressures are exerted through the hydro-plastic composition 3 which remove any internal cavities in the tube 1 and which firmly embed the granular particles therein thereby increasing the strength and the modulus of elasticity of the moulded part. The ram 4 may be locked by means of hydraulically controlled locking bolts (not shown) and the radially acting pressures may thus be kept constant for a predetermined period, for example, during the entire setting and, if desired, the cooling period. After locking, the pressing device may be removed from the table of the working machine by which the pressure is exerted and a further pressing device inserted into the working machine.

In the embodiment shown in Fig. 2, radially acting pressures are produced by mechanical and hydraulic means in the hydro-plastic composition 3, a deformable bag 13 (e.g. of rubber or the like) is arranged between the ram 4 and the hydro-plastic composition 3; pressure media 15 is led to the bag 13 by way of a conduit 14; it has been found advisable to arrange a heat insulating plate 16 between the bag 13 and the hydro-plastic composition 3. In order to assist the radial distribution of the pressure on the tube, or as illustrated in this embodiment, tubular sections 1', 1" and 1''', inserted into the moulding tool 2, a conical mandrel is provided on the base plate 5; the base plate 5 and the conical mandrel 35 are both provided with heating passages 11.

Fig. 3 shows a moulding tool 2 in which the radial pressures are caused to act inwardly, on the tube or tubular sections 1, as indicated by the arrows. The tube or tubular sections 1 to be compacted, are mounted about a cylindrical mandrel of the base-plate 5, after which pressure is applied by the ram 4, which is of circular cross-section, to the hydro-plastic composition 3 arranged outside the tube 1, whereby an inwardly directed radial pressure is exerted on the tube or tube sections 1; the outer walls of the tool 2 prevent leakage of the hydro-plastic composition 3. The conduits 8 and 9, for heating and cooling media, pass through the base plate 12 which latter closes the chamber 11.

When using directly applied gaseous or liquid moulding media, care should be taken that any excess pressure is at one side only of the tube 1; the tube 1 must be so arranged in the moulding tool 2 that a seal is produced on both faces. This seal is produced by arranging hydraulically controlled pistons or rings having helically grooved inter-engaging conical surfaces.

The embodiment shown in Fig. 4 comprises a tube 24 which may be metallic or non-metallic inflatable by high pressure is tightly secured in a bevelled recess in piston 20 and piston 23, disposed one at either end thereof, by means of correspondingly bevelled sealing discs 21 and 22; the radial pressures being applied to the tubes or tubular sections 1 through this tube 24. The pistons 20 and 23 are mounted on a piston rod 17 having an axial bore 18 and a radial bore 25 for the supply of pressure media 3; stuffing box 19 effects a suitable closure.

The piston rod 17 and tube 24, inflatable by the pressure media 3, is inserted into the moulding tool 2 after placing the tube or tubular sections 1 therein, whereupon high pressure moulding media is supplied by way of the bores 18 and 25 to inflate the tube 24, whereby the necessary outwardly directed radial pressure is exerted on the tube or tube sections 1. To restore the original diameter of the tube 24, if it is of a metallic nature, the ring 6 has a bore, constructed in the manner of a draw nozzle, the minimum diameter of which occurs at 26. The base-plate 5 is conically tapered at 27 so that when the tube 24 passes through it the same action occurs as in the case of the conically bored ring 6. The tube 24 is restored to its original diameter by using liquid moulding media and additionally by producing a partial vacuum.

A partial cross-section through the wall of a tubular section 1 is shown in Fig. 5. In this embodiment the walls thereof are bound with synthetic resin, wound from impregnated layers and constructed with a plurality of zones. The zones are indicated by references I, II and III, individual layers by 28 and abrasive particles embedded in zones I and III, by 29; zone II is devoid of abrasive. Tubes thus constructed with a plurality of zones may then be severed at points 30 to produce grinding rings 33, shown in cross-section in Fig. 6. Since zone II has no abrasive material, a groove 32 can be cut away from the composite ring 33; zones I and III embedded with abrasive particles remain on both sides of this groove. Such double-path grinding rings may then be inserted into grooves 34 of a carrier disc 31, and screwed, riveted or cemented thereto. The mean diameter of the grinding rings shown in Figs. 5 and 6 are indicated by $Dm$, $Dm_1$ and $Dm_2$. The multi-path grinding wheels obtained by the insertion of such grinding rings 33 into a carrier disc 31, have the advantage that, owing to the provision of grooves 32, good removal of the grinding dust is obtained; further it offers the possibility of grinding a front face which is difficult or quite impossible with a plain grinding surface.

During the application of radial pressure on the walls of the tubes or tubular sections 1, a variation in the thickness of the walls and, consequently in the diameter of the tubes, occurs as a result of removing their internal cavities, firmly embedding the abrasive granular particles therein and the deeper penetration of the resin into the yarns of the widths of fabric. It is desirable for the impregnated layers, which may be initially set, 28 to be impressed or milled to produce transverse ribs 35 (Fig.

7a) or bowl-shaped depressions 36 (Fig. 7b) and, after the winding and intermediate embedding of abrasive granular particles, they are capable of stretching in such a manner that no tearing takes place upon the application of radial pressures, or consequent changes in wall thicknesses and diameters occurring simultaneously.

With the use of layers made of metal wire, such an extension is possible due to the mechanical properties of the metal wire alone.

What I claim is:

1. A hollow cylindrical grinding body comprising a plurality of convolute laminations of fabric impregnated with a heat-setting synthetic resin, predetermined layers of said fabric constituting spaced zones being coated with a plurality of abrasive granular particles and other layers of said fabric also constituting spaced zones being free from abrasive granular particles, said last named layers being disposed between said first named layers.

2. A hollow cylindrical grinding body wound from fabric layers comprising a plurality of spaced zones of annularly convoluted fabric layers impregnated with a heat setting synthetic material and permeated with abrasive grains, a plurality of spaced zones of annularly convoluted fabric layers impregnated with a heat setting synthetic resin free from abrasive grains, and said last named zones being partially cut off for the formation of grooves.

3. A hollow cylindrical grinding body comprising an exterior zone of annularly wound fabric layers impregnated with a heat-setting synthetic resin and permeated with abrasive grains, an interior zone similarly constructed to said exterior zone, an intermediate zone of annularly wound fabric layers impregnated with a heat-setting synthetic resin and free from any abrasive grains located between said exterior and said interior zone and said intermediate zone being partially removed to form a groove whereby a good removal of ground dust may be obtained.

4. A process for manufacturing a hollow cylindrical grinding body constructed of fabric layers comprising impregnating a fabric layer with a heat-setting synthetic resin, impressing grooves in said fabric layer, disposing abrasive grains in spaced portions of said fabric layer, winding said fabric layer so that said portions having abrasive grains therein and the portions free from abrasive grains are alternately annularly wound, then heating the fabric layer so wound for hardening of the synthetic resin while simultaneously exerting a radial pressure upon one side of the hollow cylindrical grinding body so formed while the other side is held fixed.

5. A pressing tool for forming a hollow cylindrical grinding body comprising a heating and cooling base plate, a hollow cylindrical moulding part having a plastic mass capable of being heated and cooled mounted on said base plate in which said hollow cylindrical body is disposed and a pressing die for imparting a pressure upon said plastic mass located within said grinding body so that said grinding body may be subjected to pressure.

6. A pressing tool as set forth in claim 5 wherein a conical mandrel is provided upon said base plate which is located within said hollow cylindrical moulding part and projects into said moulding part, said mandrel having heating conduits therein.

7. A pressing tool as set forth in claim 5 wherein a cylindrical mandrel is mounted on said base plate, means for heating and cooling said mandrel, said hollow cylindrical grinding body being slid over said cylindrical mandrel, said hollow cylindrical moulding part being spaced from said grinding body to form an annular space, a plastic mass located in said annular space and an annular pressing ram cooperating with said mass in said annular space.

8. A pressing tool as set forth in claim 5 wherein a ring is located fixedly at the upper surface of said hollow cylindrical grinding body.

9. A pressing tool for forming hollow cylindrical grinding bodies comprising a hollow cylindrical moulding part, an inflatable tube arranged within said moulding part and spaced therefrom forming an annular space for the insertion of a hollow cylindrical grinding body, a piston rod, a pair of pistons mounted upon said piston rod to which said tube is secured, said piston rod having an axial and a radial bore therein designed to be connected to a pressure supply, a ring located at the upper surface of said hollow cylindrical body, a base plate upon which said grinding body rests, said base plate and said ring being provided with nozzle-like bores with the smallest diameter thereof equal to the exterior diameter of said sube before said tube is inflated for applying pressure to said hollow cylindrical grinding body.

10. A method of manufacturing a hollow cylindrical grinding body comprising forming a fabric impregnated with a heat-setting synthetic resin, pressing hollows into said fabric and spreading hard granular particles upon spaced parts of said fabric while leaving other parts thereof free from granular particles, alternately winding said parts and then heating the hollow cylindrical grinding body so formed for hardening said synthetic resin and at the same time applying pressure to one side of the hollow cylindrical grinding body so formed while the other side is kept tight and immovable.

References Cited in the file of this patent

UNITED STATES PATENTS

| | | |
|---|---|---|
| 2,054,210 | Weisenburg | Mar. 9, 1937 |
| 2,073,590 | Sanford | Mar. 9, 1937 |
| 2,141,155 | Merriam | Dec. 20, 1938 |
| 2,172,243 | Goodnow et al. | Sept. 5, 1939 |
| 2,226,607 | Gilmore et al. | Dec. 31, 1940 |
| 2,268,663 | Kurzmick | Jan. 6, 1942 |
| 2,334,048 | Van Der Pyl | Nov. 9, 1943 |
| 2,467,596 | Pratt | Apr. 19, 1949 |

FOREIGN PATENTS

| | | |
|---|---|---|
| 491,658 | Great Britain | Sept. 6, 1938 |